Dec. 26, 1933.       G. L. ERTZ       1,940,712
METHOD AND MEANS FOR BRAKING VEHICLES
Filed April 2, 1925       2 Sheets-Sheet 1
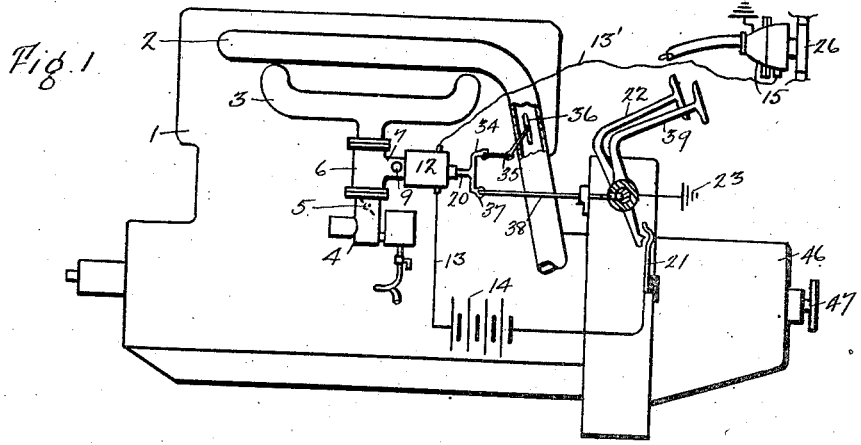
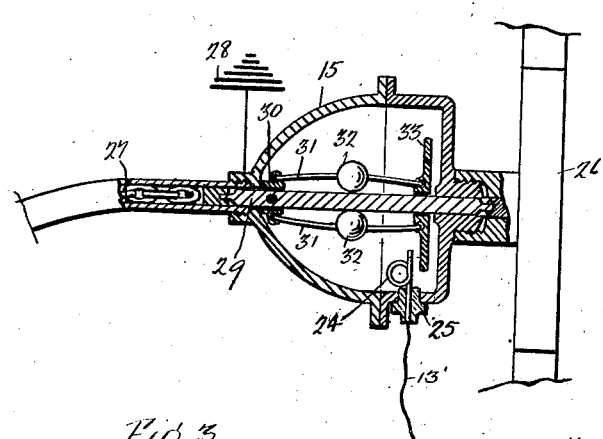
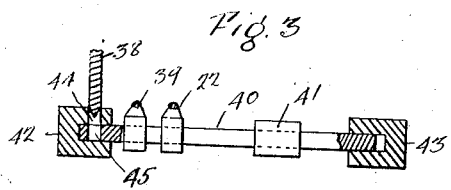
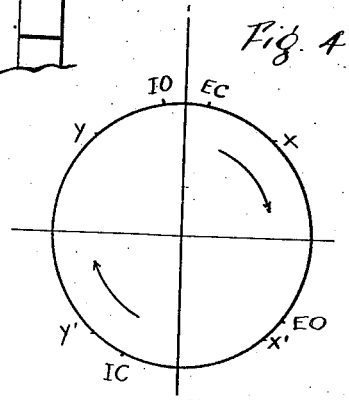
INVENTOR
G. L. Ertz
BY Charles L. Stoke
ATTORNEY

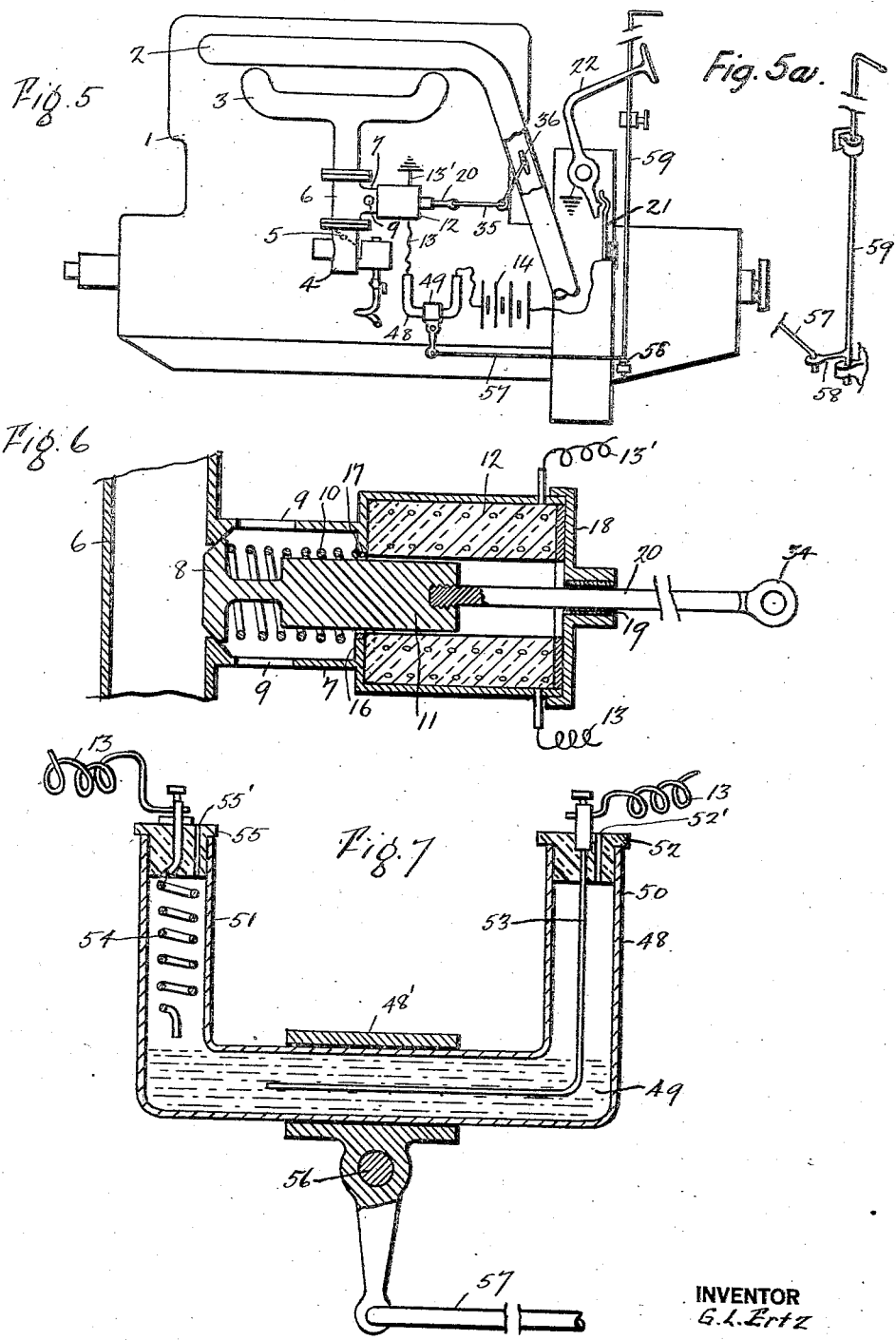

Patented Dec. 26, 1933

1,940,712

UNITED STATES PATENT OFFICE 1,940,712

METHOD AND MEANS FOR BRAKING VEHICLES

George L. Ertz, Los Angeles, Calif., assignor, by mesne assignments, to Messinger Devices, Incorporated, Bridgeport, Conn., a corporation of Connecticut Application April 2, 1925. Serial No. 20,126

27 Claims. (Cl. 123—97)

My invention relates to improvements in methods and apparatus for applying a braking force for slowing down and/or stopping a moving vehicle.

The principal object of my invention is to utilize a braking force generated within an internal combustion engine carried by a vehicle and to apply said force through the mechanism connecting the vehicle wheels with the engine.

Another object of my invention is to utilize the braking effort of an internal combustion engine to reduce the wear and tear on a pedally operated set of brakes.

Another object of my invention is to apply an increased braking force to a moving vehicle automatically when a foot operated brake is actuated.

Another object of my invention is to effect a great economy in gasoline consumption in an automobile.

Another object of my invention is to provide an improved increased braking force which automatically comes into play in a vehicle upon deceleration thereof.

Another object of my invention is to provide automatic braking force for an automobile which will become inoperative under predetermined conditions.

Other objects of my invention will become more apparent and will be set forth as my invention becomes more fully disclosed hereafter.

Referring to the drawings in which the same numbers indicate like parts:—

Fig. 1 is a view showing one form of the application of my method to an internal combustion engine in an automobile.

Fig. 2 is a vertical section, partly in elevation, of part of Fig. 1.

Fig. 3 is a horizontal section partly in elevation of a part of Fig. 1.

Fig. 4 is a diagram illustrative of one of the principles utilized in my invention.

Fig. 5 is an alternative construction.

Fig. 5a is a perspective view of one of the controls with parts broken away.

Fig. 6 is a vertical section of like apparatus used in Figs. 4 and 5.

Fig. 7 is a vertical section of apparatus shown in Fig. 5 as an alternative to the apparatus shown in Fig. 2.

The present day automobiles, trucks, etc., are generally driven by a multi-cylinder four cycle internal combustion engine affixed to the frame thereof, which engine imparts its power to the rear wheels through suitable driving mechanism.

The present day automobile may be equipped with pedally operated brakes, adapted to be applied to the rear wheels for slowing down or stopping the vehicle, or to the front wheels, or to both the front and rear wheels. Such automobiles are also generally equipped with so-called hand operated emergency brake adapted to be applied to the rear wheels when said automobile is unoccupied, or at a desired emergency period.

The system of applying pedally operated brakes to all four wheels of an automobile is being adopted because of improved braking effect, to the end that the vehicle may be stopped more quickly and skidding thereof being prevented. In operating such automobiles with a pedally operated braking system, the brakes may become locked and furthermore the effort required over a long period of time, such as for instance descending a long steep grade, is very great. Also, when pedally operated brakes are applied to an automobile, the engine throttle is usually closed to the end that during the period of deceleration, no matter how long, a great deal of gasoline is consumed in keeping the engine running or in passing through the engine and it is a well known fact that in quick deceleration from high to low speed, very objectionable, and very often dangerous, explosions take place in the exhaust pipe of an automobile engine due to the ignition therein of explosive charges passing through the engine cylinders unfired, or due to the mixture being slow burning.

It is an object of my invention to eliminate all the defects above mentioned by a simple method of utilizing a braking force in an automobile engine itself which can be applied directly to the rear wheels of the automobile to obtain an economical speedy, effective, and cushioned braking effect.

Referring particularly to Figs. 1, 2, 3, 4 and 6, such an engine as described is shown at 1 and includes an exhaust pipe 2 and an intake manifold 3 to which is attached a carburetor 4 for supplying engine 1 with air and liquid fuel, or a combustible mixture. The speed of engine 1 is controlled by a manual or foot controlled throttle 5 and I insert between intake 3 and carburetor 4 a casing 6 having an extension 7 which leads to and is preferably at least of the same internal diameter as the intake 3 and carburetor 5. A valve 8 is adapted to admit and exclude the passage of atmosphere through a plurality of ports 9 to the interior of 6, valve 8 being held on a seat by a spring 10 and also by the suction of engine 1, and valve 8 preferably will permit an annular opening as large as extension 7. The stem of valve 8 forms an armature 11 adapted to be moved by the influence of current passing through the windings of a solenoid 12 surrounding the same and solenoid 12 has one terminal 13 connected to a storage battery 14 and has the other terminal 13' connected to a control device 15.

Referring particularly to Fig. 6 it will be seen that the solenoid windings 12 are held in an extended part of 7 by means of an internal flange 16 which has a brass collar 17 surrounding the armature 11 the outer end of 7 being closed by a cap 18 containing a brass journal 19 through which a brass rod 20 slides, the same being connected to the armature 11 and it will be noted that extension 7 and cap 18 may be made of iron in order to form a yoke around the solenoid windings 12 whereby a minimum current may be used for operating the valve 8.

One pole of storage battery 14 is connected to a spring switch 21 fastened and insulated to a convenient part of engine 1 and a circuit is adapted to be made by contact of part of the brake pedal 22, which is grounded at 23, with the switch 21. The other pole of storage battery 14 is, as already described connected to the terminals 13 and 13' through the solenoid windings 12 with a spring contact 24 set in an insulated plug 25 in the control 15 and referring particularly to Fig. 2 it will be seen that the control 15 is adapted to be placed on an automobile between the speedometer 26 and the drive chain 27 therefor, the drive chain 27 being connected in any well known manner to a wheel of the automobile (not shown) carrying engine 1.

The control 15 is divided in two sections and is grounded at 28 and contains a central shaft 29 one end of which is linked to the drive chain 27 the other end being linked to the speedometer 26 and a coller 30 is pinned on the shaft 29 for pivotally holding a plurality of springs 31 on which are centrally fixed a plurality of governor fly balls 32, the other end of springs 31 being attached to a sliding collar, or disc, 33 adapted by its movement to make and break the circuit by contact with the spring 24.

The rod 20 is forked, having one arm 34 connected by linkage 35 to a valve 36 placed in exhaust pipe 2, the other arm 37 being connected to a rod 38 adapted to lock the clutch pedal 39 in a predetermined position above a predetermined speed of the automobile and by referring particularly to Fig. 3, a common construction is illustrated wherein it will be seen that the clutch pedal 39 is generally firmly fastened to a clutch rod 40 to which is also fastened a clutch yoke arm 41. The brake pedal 22 moves freely on rod 40 which is journaled at each end in boxes 42 and 43 firmly fastened to a part of the automobile. The rod 38 is adapted to slide in a hole 44 in box 42 and the rod 40 has a hole 45 bored therethrough adapted to receive the end of rod 38 at a predetermined time for locking the clutch pedal 39 in position as will be hereinafter explained. It is understood, of course, that both the brake pedal 22 and the clutch pedal 29 are generally always held in a predetermined position by springs (not shown) to the end that normally the brakes pedally operated by 22 will remain unset and the clutch operated by pedal 39 will be in full engagement, said clutch serving to engage the mechanism of engine 1 with suitable transmission gearing in gear box 46 which is connected through shaft 47 to the rear wheels of the automobile.

The operation of my method by the application of the apparatus already described is as follows:—

Referring now particularly to Fig. 4, which is diagrammatic of the valve opening in a four cycle engine, such as is principally utilized in my invention, although the same may be applied to two cycle engines, it will be seen on the intake stroke of any particular cylinder of engine 1 that the point IO indicates a common position for the start of the inlet valve to open, which is generally a few degrees before upper dead center. The inlet valve remains open until the point IC is reached when the inlet valve closes and this point is generally about 20° past bottom dead center. From the point IC upward in the cycle compression will take place in the cylinder until the charge of combustible mixture drawn in from carburetor 4 is fired and this point may be at any suitable time before or after the piston reaches upper dead center. The expansion stroke now takes place until the point EO is reached, which may be at 145° of stroke past upper dead center, and from the point EO onward the exhaust gases will pass to atmosphere through the exhaust pipe 2 under a pressure caused first by their own inertia and secondly by the exhaust stroke of the piston until the point EC is reached when the exhaust valve closes and the point EC is generally a few degrees past dead center.

If the diagram is referred to it will be seen that the piston travel in any cylinder of engine 1 from the point X to the point X' will be faster than the piston travel from the point X' to the point Y' and correspondingly the piston travel from the point Y' to the point Y will be faster than the travel of the piston from the point Y to the point X and this fact is utilized by me largely in the application of braking force generated in engine 1 on the four stroke cycle as already described.

Let it be assumed that the automobile carrying engine 1 is being driven at a speed of sixty miles per hour. At this speed the clutch actuated by pedal 39 will be fully engaged, the brakes (front wheel or rear wheel or both) operated by pedal 22 will be unset, valve 8 will be tightly closed, and the circuit joining storage battery 14 with switch 21 and control 15 will be broken at switch 21.

Let it be assumed also that the governor fly balls 32 and springs 31 are calibrated so that the disc 33 will only come in contact with contact 24 above a predetermined speed at fifteen miles per hour. At this time therefore it will be seen that the circuit must be closed by contact of disc 33 with contact 24 but will be opened because pedal 22 will not be in contact with switch 21.

If now it is desired to rapidly decelerate the automobile carrying engine 1, throttle 5 will first be quickly closed and immediately thereafter pedal 22 will be depressed a greater or less amount, depending on the desired deceleration, for applying the brakes to any number of the automobile wheels. A predetermined depression of pedal 22 will completely close the circuit in which storage battery 14 is placed to the end that the solenoid windings 12 are immediately energized by a predetermined current for actuating the armature 11 and opening valve 8, whereupon a sufficient amount of air is drawn through ports 9 and casing 6 to fill the cylinders of engine 1 whereby the suction of engine 1 is substantially completely diverted from carburetor 4.

The outward movement of armature 11 at the same time causes the movement of valve 36 by means of rod 20 and linkage 35 to the end that valve 36 substantially closes exhaust pipe 2. This action on the four stroke cycle results as follows:—

The intake stroke now completely fills the cylinder with its maximum charge of air substantially at atmospheric pressure. This air is compressed on the compression stroke whereby energy is stored up therein and the energy contained therein is returned to the engine on the expansion stroke thereof. Thus there is a balancing of the compression and expansion strokes. However on the exhaust stroke the air admitted on the intake stroke at atmospheric pressure is fully compressed but such compression, as already explained, is quickly gained from the point Y' to point Y in the stroke and thereafter the pressure of the air is relieved at a predetermined rate due to the fact that valve 36 only substantially closes exhaust pipe 2, it being understood that exhaust pipe 2 and valve 36 may be of circular form whereby an annular space may be left between the periphery of valve 36 and the interior of exhaust pipe 2, until the inlet valve opens at 10.

In this manner a predetermined back pressure against rotation is built up successively in the cylinders of engine 1, which back pressure is applied through the mechanical connection of gear box 46 and further to the rear axles and wheels of the automobile carrying engine 1, but this back pressure against rotation being cushioned, in other words not being held, is designed to apply a great braking effort to the rear wheels but will not lock the same.

It will readily be seen that even a few pounds of back pressure generated in the cylinders of engine 1 in this manner will be greatly multiplied in its application to the rear wheels, not only on account of a reduction in gearing which may be used through gear box 46, but also through the reduction in gearing, even in high gear, which is applied through the usual differential (not shown) on the rear axle of the automobile.

When deceleration is commenced by depressing pedal 22, as described, the movement of rod 20 may also actuate the rod 38 for locking rod 40 in box 42 whereby movement of pedal 39 is prevented and thereby the disengagement of engine 1 with the rear wheels is also prevented and upon continued deceleration it will be seen that such disengagement cannot occur until a speed of fifteen miles per hour is reached and also engine 1 will not be subjected to any power impulses whatsoever due to the fact that the suction of engine 1 is diverted from carburetor 4 by means of the air passing through ports 9.

When a speed of fifteen miles per hour is reached, or any other predetermined minimum speed, it will be seen then that the action of springs 31 and the fly balls 32 will cause a disengagement of the disc 33 with contact 24 whereby the circuit is immediately broken and valve 8 is closed immediately by spring 10 notwithstanding the fact that pedal 22 will still be in contact with switch 21. Thereafter, continued deceleration from fifteen miles per hour, can, I find, be satisfactorily accomplished by means of the braking effect exerted solely by the depression of pedal 22 and also at this predetermined speed of the vehicle, it will be noted that the closing of valve 8 immediately opens valve 36 and also establishes communication of the engine cylinders with the carburetor 4 whereby the inertia of the automobile at this speed is sufficient to spin the mechanism in engine 1 whereby the combustible charge will be introduced and exploded in each cylinder thereof in their regular firing order.

Thus it is impossible to stall engine 1 and at the same time the maximum braking effect is exerted when it is most needed i. e., at times of deceleration from highest speed.

Inasmuch as it is inadvisable to put the full output of storage battery 14 through the solenoid windings 12, I arrange a suitable resistance in the circuit calibrated to obtain the desired actuation of valve 8 and this may be satisfactorily accomplished by making the spring contact 24 as a horizontally wound helical spring of a suitable resistance wire, but it is obvious, of course, that such resistance may be placed at another suitable point in the circuit, or that the solenoid windings 12 may themselves include all necessary resistance.

The amount of back pressure obtained by the closing of exhaust pipe 2 by means of valve 36 may be regulated by the size of the annular space between valve 36 and exhaust pipe 2, and it will be noted that valve 36 may be of the well known circular butterfly type of balanced valve, or may contain holes therethrough which would be the equivalent of the annular space, but many modifications of this arrangement are apparent to obtain the desired effect.

Referring now particularly to Figs. 3, 4, 5, 6 and 7, a like result is obtained according to the deceleration of the automobile, by means of an inertia decelerator 48 which is pivoted on a bracket 48' at any suitable point on engine 1. It will be seen that said decelerator includes a casing 48 in which a body of mercury 49 will maintain a certain position on a horizontal plane and casing 48 is arranged with a leg 50 and a leg 51 both setting in a vertical direction. The leg 50 contains an insulated plug 52 in which a terminal 53 is set being adapted to extend to a certain point in mercury 49, and 53 is joined to the wire 13 leading to the battery 14. A small air vent 52' is provided in plug 52.

The other leg 51 contains a helical coil of resistance wire 54 which is held in an insulated plug 55. The decelerator is connected in series with the battery and solenoid 12. The conductor or terminal 13 is severed, and one end is attached to the terminal 53 and the other end to the terminal 54, as clearly shown in Fig. 5 of the drawings. An air vent 55' is provided in plug 55. The bracket 48' is adapted to rock on a pivot 56, the bracket being joined at one end by the horizontal rod 57 and a linkage 58 to be manually operated from the automobile dash by a vertical rod 59 to the end that the position of mercury 49 may be varied for maintaining the solenoid 12 in an operative or inoperative position.

The application of this device is similar to that already described, for it will be seen that upon deceleration of the vehicle to which decelerator 48 and engine 1 is attached, mercury 49 will, by its inertia, rise up in leg 51, thereby closing the circuit and placing therein a predetermined amount of resistance according to the resistance of helix 54 and thereafter the depression of 22 will complete the closing of the circuit whereby valve 8 will operate as already described and the braking effort of engine 1 will be applied to the rear wheels.

With this construction of decelerator, it will be seen that the same is automatically operative and inoperative upon descending or ascending a grade for making one closure of the circuit, in other words it is effective automatically on grades, irrespective of the speed of the vehicle and at the same time according to the variable resistance offered by helix 54, valve 8 may be calibrated to open a greater or less extent, although as a general rule, I prefer to absolutely open valve 8 its maximum amount each time the apparatus is operative.

Should it be desired at any time to manually apply this type of decelerator, it will be seen that the movement of rod 59 will cause rod 57 to change the position of casing 48 to the end that it may become operative at any desired time and in this manner it will be seen that the circuit closing effects within 48 are quite equivalent to the effect, such as is now commonly practiced, of closing the ignition switch whereby an assumed braking effect is said to be had from an engine, because if an ordinary ignition switch is so placed to cut off the ignition of engine 1 and thereby close a switch equivalent to the structure in 48, it will be seen that a braking effect will be had apparently mechanically similar to that which I propose, but which in reality is vastly different.

It is a common statement that an automobile may be braked by the engine compression due to cutting off the ignition to the engine and opening wide the carburetor throttle 5, but an analysis of this statement proves its inaccuracy. If the cylinders of engine 1 be sucking in the full charge of combustible mixture, due to the carburetor throttle 5 being wide open, at atmospheric pressure on the intake stroke and said charge is compressed on the compression stroke, it may easily be seen that the work of compression is returned to the engine on the expansion stroke when the ignition is cut off. Thereafter on the exhaust stroke, the combustible mixture is expelled to atmosphere substantially at atmospheric pressure through pipe 2.

Therefore nothing in the way of braking occurs because the intake and exhaust strokes are balanced at substantially atmospheric pressure and the compression and expansion strokes are also balanced. Thus no braking effect whatsoever is derived in excess of the friction of the mechanical parts of the engine, but furthermore serious defects do occur, because a great waste of gasoline takes place, occasioning explosions in the exhaust pipe and also cutting the lubricant from the cylinder walls.

These defects I am now able to overcome by my method and apparatus whereby a positive braking effect may be applied with economy of operation and also with economy in automobile construction, because, by my method, it may be seen in an automobile having four wheel brakes, that I can dispense with any brakes whatsoever on the rear wheels operated by pedal 22 and may attach in place thereof solely the emergency brake already referred to. In this manner a balanced four wheel foot braking system may be had whereby pedal 22 will actuate the brakes on the front wheels by any well known system and the braking effect on the rear wheels will also be exerted indirectly by the depression of pedal 22 by means of the mechanism already described.

It should be noted that speedometer 26 and decelerator 48 are both instruments which automatically provide decelerating and accelerating movements. These movements are provided positively by the mechanical connection of chain 27 to a wheel of the automobile through control 15 to speedometer 26 and are provided in decelerator 48 automatically by the inertia of mercury 49, but both systems are thrown into operation by the preliminary slight depression of pedal 22.

It should be understood that the provision of the lock rod 38 is not necessary under all conditions to my invention but is provided to overcome the tendency of some drivers of automobiles to depress both the clutch pedal 39 and the brake pedal 22 at the same time and may or may not be used as desired. Most automobile companies instruct drivers never to disengage the clutch when depressing the pedal 22 in order to utilize the full braking effect exerted by the mechanical friction in engine 1, but this effect is only partial as I have already explained, more so, because the engine ignition is not cut off at such times, and therefore rod 38 is provided to be installed when necessary.

I do not limit myself to the application of my method and apparatus to any minimum speed of a vehicle for rendering the said apparatus inoperative, and many equivalents are apparent to those skilled in the art, but all such are intended to come within the scope of the appended claims wherein

I claim:

1. In a vehicle impelled by an internal combustion engine, a brake lever, means operable by said brake lever for decelerating said vehicle including a valve for throttling the exhaust of the engine, and separate means for automatically preventing the operation of said valve until the vehicle has attained a predetermined speed.

2. In combination, an internal combustion engine adapted to propel a vehicle provided with conventional wheels and brakes therefor, means adapted to be operated by the driver of the vehicle for applying the brakes, and means electrically operative by movement of said braking means, only while the speed of said vehicle is above a predetermined minimum, for causing a back pressure in the engine for further decelerating said vehicle.

3. In a braking system for a motor vehicle, an internal combustion engine comprising an intake manifold, an exhaust manifold, a valve in said exhaust manifold, a brake operating pedal, and means for completely closing said valve when said brake operating pedal is slightly depressed only while said vehicle is moving at a speed above a predetermined minimum.

4. In a brakng system for a motor vehicle, an engine for propelling said vehicle, said engine comprising an intake passage provided with a throttle and with an auxiliary air passage above said throttle, a valve for closing said air passage, a pedal on said engine for operating the braking mechanism for said vehicle, and electrical means for opening said valve upon the depression of said pedal while said vehicle is moving at a speed above a predetermined minimum and becoming automatically inoperative when the speed of said vehicle falls below said minimum.

5. In a braking system for a motor vehicle, an internal combustion engine for propelling said vehicle, said engine being provided with an intake passage having an auxiliary air passage, a valve for normally closing said air passage, brake and clutch pedals associated with said engine, means controlled by the speed of the vehicle for automatically opening said valve upon the depression of said pedal while the vehicle is moving above a predetermined speed, and means for locking said clutch pedal upon depressing said brake pedal when said vehicle exceeds a predetermined speed limit.

6. In a braking system for a motor vehicle, an internal combustion engine for propelling said vehicle, an intake and an exhaust passage for said engine, a pedal for operating the brake mechanism for said vehicle, and means including an electrical device controlled by the operation of said pedal for automatically throttling said exhaust passage for retarding the speed of said vehicle when said speed is above a predetermined minimum.

7. In a braking system for a motor vehicle, an internal combustion engine for propelling said vehicle, an intake and an exhaust passage for said engine, a valve in said exhaust passage, a foot pedal, and means for automatically closing said valve upon the operation of said pedal, said means being inoperative when the speed of said vehicle is below a predetermined minimum.

8. In a braking system for a motor vehicle, an engine for propelling said vehicle, a carburetor for supplying an explosive mixture to said engine and means comprising mechanism controlled by the speed of said vehicle for suddenly relieving suction on said carburetor and for supplying air only to said engine when said vehicle is suddenly decelerated while moving above a predetermined speed.

9. In a braking system for a motor vehicle, an internal combustion engine for propelling said vehicle, an intake and an exhaust passage for said engine, an auxiliary air duct in communication with said intake passage, a valve for closing said air duct, a solenoid for opening said valve, a brake pedal for operating the brake mechanism for said vehicle, and means for completing a circuit through said solenoid for opening said valve when said pedal is depressed, and means for rendering said first-named means inoperative when the speed of said vehicle falls below a predetermined minimum.

10. In combination, an internal combustion engine adapted to propel a vehicle provided with conventional wheels and brakes therefor, a brake lever adapted to operate said brakes, and means controlled by said lever for assisting in retarding the speed of said vehicle only when the same is moving at a speed above a predetermined minimum, said means comprising electrically operated mechanism for throttling the exhaust of said engine.

11. In a braking system for a motor vehicle, an internal combustion engine adapted to propel said vehicle, a lever, an intake and an exhaust passage for said engine, and means including mechanism automatically controlled by the speed of said vehicle for opening the intake to the atmosphere and for throttling said exhaust passage only when said lever is operated while said vehicle is traveling above a minimum speed, said means becoming automatically inoperative when the speed of said vehicle falls below said minimum.

12. In a brake mechanism for a motor vehicle, the combination of an internal combustion engine adapted to propel said vehicle, a brake lever, a clutch lever, an intake and an exhaust passage for said engine, means for automatically opening the intake to the atmosphere and for throttling said exhaust passage when said brake lever is operated while said vehicle is travelling above a minimum speed, and means associated with said first mentioned means to lock the clutch member in an engaged position whenever the brake lever is operated above the said minimum speed.

13. In combination, an internal combustion engine adapted to propel a vehicle provided with conventional wheels and brakes therefor, said engine comprising an intake passage provided with a throttle and an auxiliary air passage posterior to said throttle, a brake pedal for operating said brakes, and means controlled by the operation of said pedal and the speed of said vehicle for opening said air passage upon a relatively slight depression of said brake pedal, said brake pedal upon a further depression thereof operating the said brakes.

14. In combination, an internal combustion engine adapted to propel a vehicle provided with conventional wheels and brakes therefor, a brake pedal for operating said brakes, said engine comprising an intake and an exhaust passage for said engine, means controlled by the speed of the said engine for automatically opening the intake to vehicle for automatically opening the intake to the atmosphere and for throttling said exhaust passage upon a given depression of said brake pedal, said brake pedal, upon a further depression thereof, operating the said brakes.

15. In a braking system for a motor vehicle, an internal combustion engine for propelling said vehicle, said engine comprising an intake passage, a carburetor for supplying an explosive mixture to said passage, an air passage connected to said intake passage, a valve for closing said air passage, means including electrically operated mechanism for opening said valve for supplying air to said intake passage to the exclusion of said mixture upon decelerating said vehicle when the speed thereof exceeds a predetermined minimum, said means comprising a speedometer shaft, a governor mounted on said shaft, said governor carrying a rotatable disk adapted to contact with a contact to close an electrical circuit when the shaft is rotated at a predetermined speed, said means being inoperative when the speed of said vehicle falls below a predetermined minimum.

16. In a motor vehicle provided with an internal combustion engine for propelling said vehicle, a carburetor for supplying an explosive mixture to said engine, and means including mechanism controlled by the speed of said vehicle for supplying air to said engine in excess of the fuel combustion requirements thereof when said vehicle is suddenly decelerated while moving above a predetermined speed.

17. In a motor vehicle provided with an internal combustion engine, a carburetor for supplying an explosive mixture to said engine, and means including mechanism controlled by the speed of said vehicle when the same is above a predetermined amount, for suddenly substituting a non-explosive mixture for said explosive mixture upon sudden deceleration of said vehicle while moving above said predetermined speed.

18. In a motor vehicle provided with an internal combustion engine having an intake passage and a carburetor, an auxiliary air passage for supplying air to said intake, a valve for said auxiliary passage, and means comprising electrically operated mechanism controlled by the speed of said vehicle for operating said valve upon a rapid deceleration of said vehicle while moving above a predetermined speed.

19. In a motor vehicle provided with an internal combustion engine for propelling the same through a gear box containing clutch mechanism for connecting and disconnecting the same, said engine having an intake passage and a carburetor attached thereto for supplying an explosive mixture to the engine, means for decelerating said vehicle, means for supplying air to the exclusion of said mixture, said last-named means becoming automatically operable when said vehicle is decelerated by the operation of said first-named means from above a predetermined speed with said clutch mechanism engaged with said engine and automatically becoming inoperative when said vehicle decelerates to said speed under like conditions.

20. In a motor vehicle provided with an internal combustion engine for propelling the same, an intake passage for said engine, a carburetor for supplying an explosive mixture to said passage, means for decelerating said vehicle, and means for automatically supplying a non-explosive mixture only to said engine upon the deceleration of said vehicle through the operation of said first-named means.

21. In a braking system for motor vehicles, an internal combustion engine for propelling said vehicle, said engine comprising an intake passage, a carburetor for supplying an explosive mixture to said passage, an air passage connected to said intake passage posterior to said carburetor, a valve for closing said air passage, speed responsive mechanism, and means including said mechanism for opening said valve upon the deceleration of said vehicle when the speed of said vehicle exceeds a predetermined minimum for supplying air only to said intake passage.

22. In a motor vehicle having an internal combustion engine for propelling the same, an intake passage for said engine, a carburetor for supplying an explosive mixture to said passage, means for suddenly introducing air into said passage to the exclusion of said mixture, and means for automatically operating said first-named means when said vehicle is decelerated while moving above a predetermined speed.

23. In a motor vehicle having a power shaft for operating said vehicle, a clutch for said shaft, an engine for operating said shaft through said clutch, an intake passage for said engine, a carburetor for supplying an explosive mixture to said engine, a throttle in said passage for controlling the flow of said mixture through said passage, an air passage for supplying air to said intake passage posterior to said throttle, and means controlled by the speed of said engine while clutched to said shaft for opening said air passage when the speed of said engine is suddenly decelerated only while operating above a predetermined speed.

24. In a motor vehicle having clutch mechanism and an engine for propelling said vehicle through said clutch mechanism, an intake passage for said engine, a carburetor for supplying an explosive mixture to said passage, an air passage for conducting air to said intake passage posterior to said carburetor, means controlled by the speed of said engine for suddenly opening said air passage only upon sudden deceleration of said engine while it is clutched to said vehicle and operating above a predetermined speed, and for automatically closing said passage when the speed of said engine falls below said minimum under like conditions.

25. In a motor vehicle having a power shaft for propelling said vehicle, an engine for operating said shaft, said engine comprising a crankshaft, a clutch for connecting and disconnecting said crankshaft to said power shaft, an intake passage for said engine, means for supplying an explosive mixture to said passage, an auxiliary air passage for supplying air to said intake passage, a valve for said auxiliary air passage, and means controlled by the speed of the engine, only when the same is above a predetermined maximum and while said shafts are clutched together, for suddenly opening said valve upon the sudden deceleration of said engine.

26. In a motor vehicle having an internal combustion engine for propelling the same, an intake passage to said engine, a carburetor for supplying explosive mixture to said passage, means for stopping the flow of explosive mixture to said engine, and means whereby said means is operative only on deceleration of the vehicle when the latter is moving above a predetermined speed.

27. In a motor vehicle having an internal combustion engine for propelling the same, an intake passage for said engine, a carburetor for supplying an explosive mixture to said passage, electrically controlled means for introducing air into said passage to the exclusion of said mixture, and means for automatically closing a circuit to said electrically controlled means when said vehicle is decelerated while moving above a predetermined speed.

GEORGE L. ERTZ.